United States Patent [19]

Crumbley et al.

[11] Patent Number: 5,328,506
[45] Date of Patent: Jul. 12, 1994

[54] PIGMENT PRODUCTS IN AN AGGLOMERATED FORM AND USE THEREOF IN BULK SHIPMENTS

[75] Inventors: Russell R. Crumbley, Macon; James T. Palmer, McIntyre, both of Ga.; Raymond G. Downey, Middletown, N.J.; Mitchell J. Willis, Macon, Ga.; Michael Pavol, Bridgewater, N.J.

[73] Assignee: Engelhard Corporation, Iselin, N.J.

[21] Appl. No.: 955,544

[22] Filed: Oct. 1, 1992

[51] Int. Cl.$^5$ .............................. C04B 14/00
[52] U.S. Cl. ........................ 106/416; 106/486
[58] Field of Search ..................... 106/416, 486

[56] References Cited

U.S. PATENT DOCUMENTS

| | | | |
|---|---|---|---|
| 3,586,523 | 6/1971 | Fanselow et al. | 106/486 |
| 4,192,841 | 3/1980 | Robertson et al. | 264/117 |
| 4,241,001 | 12/1980 | Lamond et al. | 264/117 |
| 4,246,220 | 1/1981 | Lamond et al. | 264/117 |
| 4,346,178 | 8/1982 | Economou | 106/416 |
| 4,381,948 | 5/1983 | McConnell et al. | 106/416 |
| 4,561,597 | 12/1985 | Cook et al. | 241/17 |
| 4,593,860 | 6/1986 | Cook et al. | 241/23 |
| 4,894,189 | 1/1990 | Dave et al. | 264/15 |
| 4,976,786 | 12/1990 | Dunaway et al. | 106/485 |
| 5,074,475 | 12/1991 | Suitch et al. | 106/416 |
| 5,151,124 | 9/1992 | Rice | 106/416 |

OTHER PUBLICATIONS

J. M. Huber Corporation, *Kaolin Clays and their Industrial Uses*, New York, N.Y. (1949), p. 34.
English China Clays, Unidentified Product Brochure (no date).

*Primary Examiner*—Mark L. Bell
*Assistant Examiner*—Willie J. Thompson
*Attorney, Agent, or Firm*—Inez L. Moselle

[57] ABSTRACT

Pigments in a form for bulk shipment are prepared by kneading dry pigment particles with a limited amount of water or an aqueous slurry of pigment particles to form dough-like, dust-free agglomerates which are shipped without subsequent drying and/or compaction.

21 Claims, 1 Drawing Sheet

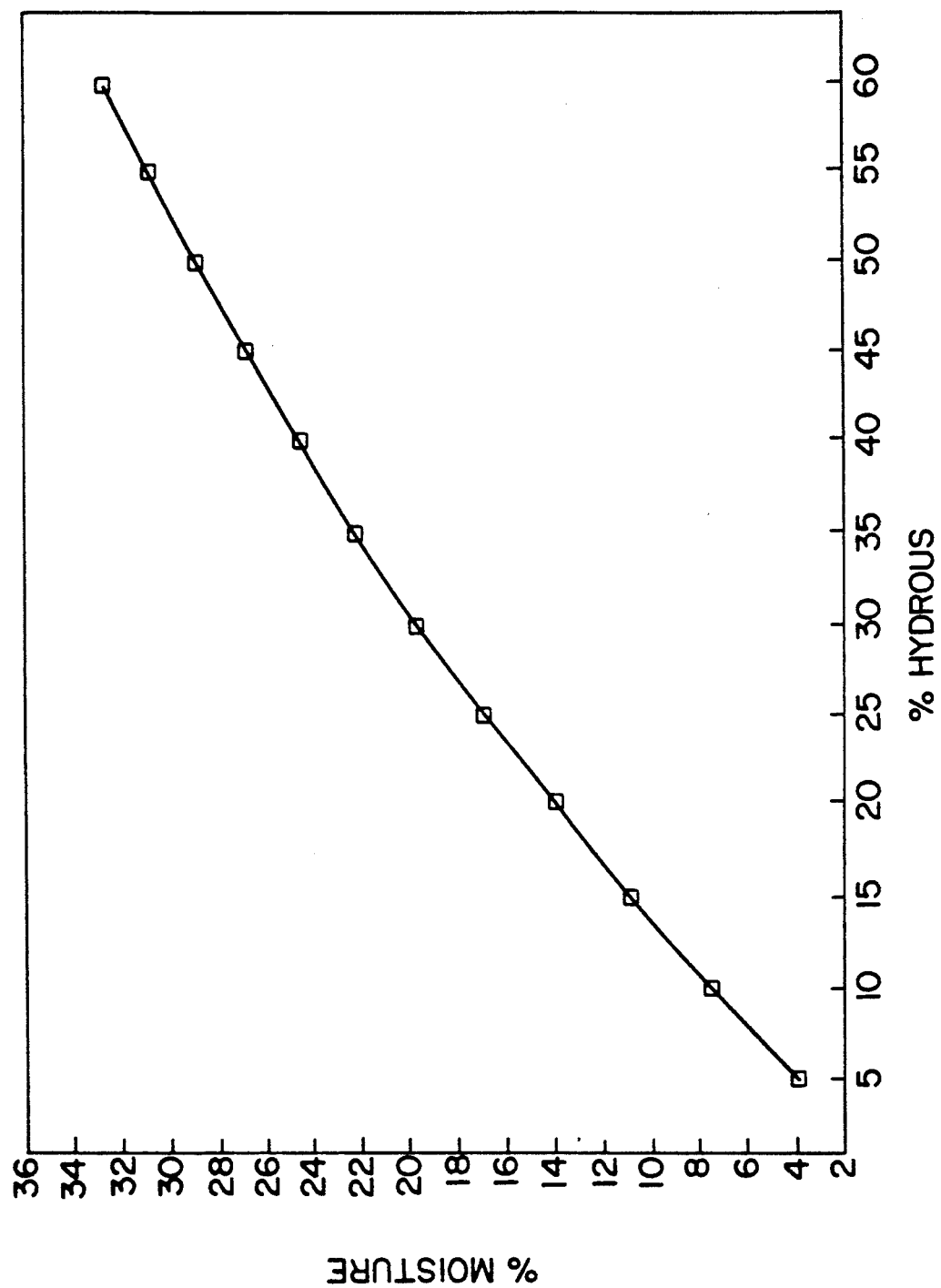

PIGMENT PRODUCTS IN AN AGGLOMERATED FORM AND USE THEREOF IN BULK SHIPMENTS

This invention relates to powdered pigment products in a dustless, coherent, moist, dough-like, agglomerated form useful for shipments in bulk. The invention relates also to the manufacture of such products, including composite pigment products, by a kneading procedure employing controlled addition of water or an aqueous slurry of pigment to dry pigment.

Kaolin pigments have been widely used for many years by the paper industry to coat and fill paper and paperboard products. Such pigments are also used by the paint, plastics and ink industries. These pigments are available in a large number of grades, including low abrasion calcined pigments and hydrous (uncalcined) kaolin products. Hydrous products include delaminated and undelaminated grades. The kaolin product selected by the paper maker is dictated by the particular end use, such as the grade of paper. In the case of paper filler, a relatively coarse product or a calcined kaolin is usually selected. In the case of paper coating pigments, the selected kaolin product may be a #0, #1 or #2 grade, a delaminated kaolin, a calcined kaolin or a mixture. For example, some premium grades of coated paper utilize a mixture of calcined kaolin and hydrous kaolins such as mechanically delaminated kaolin.

In the early days of the kaolin industry in the United States, refined hydrous kaolin pigments were exclusively prepared by filtering slurries of wet processed kaolins through filter cloths, forming an acidic filter cake typically containing about 30 to 35% moisture. The cakes were then dried in a rotary or tunnel dryer and milled to break up the cake into small chunks. Subsequently, it became the practice in some plants to prepare filter cakes for drying by extrusion through perforated plates and then drying the putty-like extrudate in a suitable dryer, usually a tunnel or rotary dryer to produce noodle-like pellets. The resulting "lump" type kaolins were shipped in bulk or in bags. A density of 65 pounds per cubic foot was reported in the literature for a Georgia clay (*Kaolin Clays and their Industrial Uses*, published by J. M Huber Corporation (1949)). Some lump grades were pulverized and shipped in bags. Pulverized lump grades had lower densities; values of 25-45 pounds per cubic foot were reported in the 1949 publication. These dry bag or bulk shipments of acid clays were unloaded at the site of the paper mill where the kaolin was mixed with water and clay dispersant to form a slurry which was then formulated into products such as paper coating pigments. High shear energy and addition of dispersant were required for the pigment makedown.

In the United States, spray dryers have now replaced the equipment used in the past to manufacture the early dry lump hydrous kaolins. These dryers convert clay slurry to small dry pulverulent spheres called "microspheres." Spray dried production generally utilizes labor and energy more efficiently than lump kaolin production. Nevertheless, costs incurred during the spray drying step represent a significant expense to the manufacturer. One difficulty with spray-dried products, especially spray-dried filler products, is that they are dusty. Environmental laws are placing restrictions on the utilization of spray dried kaolin production because of the dust factor. This may impose a constraint on the shipment of spray dried products. Shipment of spray dried microspheres is widespread in the United States and Japan. Not all paper mills are equipped to handle spray dried production. For example, at present, paper mills in Europe do not normally utilize spray-dried kaolins. Calcined kaolin products are not generally supplied in spray dried form. They are shipped as pulverized powders or aqueous slurries.

Production of kaolin pigments in England is frequently carried out by tube and/or pressure filters which remove more water than conventional rotary vacuum or plate and frame filtering equipment. The filter cake from a tube and/or pressure filter is passed to a mill in which the acid filter cake is broken down into small chunks which are then dried to a desired moisture content, usually about 20%. Densities of 56-69 pounds per cubic foot are reported by the supplier. Lump clays produced in rotary or Buell dryers have densities of 56-69 pounds per cubic foot and a moisture content of about 10%. Paper mills in Europe are equipped to handle these moist chunks. The equipment is highly specialized, and production rates are low. Operation of tube and/or pressure filters is labor intensive. Products are difficult to wet out by the paper maker.

In recent years slurry shipments of kaolin pigments have been widely supplied. A significant factor in the increased use of slurry shipments is that slurries avoid the dust problem associated with dry bulk handling and the wettability problem associated with use of lump clay. However, slurry shipments are limited to situations in which appropriate storing, shipping and handling equipment is available. Facilities required to handle slurry shipments require a significant capital expenditure. Few European paper mills utilize slurry shipments. The dispersed slurries may contain up to about 30% water in the case of hydrous kaolins and about 50% water in the case of calcined kaolins. The expense of transporting large volumes of water is impractical under some circumstances. Thus, slurry transport is of practical use in limited situations.

Fine particle size, low-abrasion calcined kaolin pigments, such as the products supplied under the registered trademarks ANSILEX, ANSILEX 93 and SPECTRAFIL, have become widely used by the paper industry. See, for example, U.S. Pat. No. 3,586,523 (Fanselow, et al.). Frequently paper mills mix a calcined kaolin pigment with hydrous kaolins in the paper mill. Commonly used blends contain 20 to 10 parts by weight calcined kaolin and 80 to 90 parts by weight hydrous kaolin, usually mechanically delaminated hydrous kaolin. These calcined kaolin pigments are obtained by pulverizing calcined previously spray-dried hydrous kaolins. As mentioned, the pigments are shipped as a dry pulverized powder or as an aqueous slurry.

Calcined kaolin pigments differ significantly from hydrous kaolin pigments in physical properties as well as performance properties. Among the differences between calcined and hydrous kaolins is the significantly lower bulk density and higher porosity of the calcined grades. The differences may be reflected in the enhanced performance of calcined grades in certain commercially important end use applications such as paper making. However, the differences are responsible, at least in part, for unique difficulties encountered in handling and shipping calcined kaolins. Calcined kaolin products are especially difficult to slurry and difficult to handle in conventional bulk systems. See the discussion in U.S. Pat. Nos. 4,561,597 and 4,593,860 (Cook et al.). Cook, et al. refer to unsuccessful or impractical results obtained in attempts to agglomerate calcined kaolins by addition of water using an undefined procedure. Patentees' invention involves dry ball milling calcined powder using a high energy input. Densification apparently takes place by compaction. According to the teachings of these patents, the performance properties of the calcined kaolin in paper are not "impaired to any substantial degree" (col. 4, 1.21). This indicates that a loss in opacification was in fact experienced in practice of the invention. In preferred embodiment, the ball milled material of Cook, et al. is pulverized to eliminate +325 mesh residue produced during ball milling. Patentees did not seek to eliminate dusting.

U.S. Pat. No. 4,894,189, Dave, et al., relates to a process for making spherical attrition-resistant particles, such as catalysts, by kneading powdered particles, liquid and wax, to make "dough agglomerated granules," sieving to separate granules of predetermined size, followed by spheroidizing in a heated rotating bowl.

U.S. Pat. Nos. 4,241,001 and 4,246,220, Lamond, et al., relate to a process for making densified pellets of pigmentary material such as kaolin clay (apparently hydrous kaolin). Patentees seek to provide products of "high bulk density, good handling and bulk flow properties." In common with Cook, et al., as well as other techniques involving pelletizing or compaction, the finished products intended for bulk shipment are dry. Lamond, et al. produce hard pellets intended for use by the rubber industry and do not seek to make a readily wettable dust-free product sought by the paper industry.

Prior to this invention, it was observed that gradual addition of small amounts of water to calcined kaolin powders while mixing the powders with high shear mixing resulted in large compact balls, e.g. balls of 1" diameter. These balls were clearly not suitable for subsequent slurrying by a customer utilizing conventional slurry makedown equipment. In another effort to reduce dusting, water was sprayed on spray dried hydrous kaolin while the kaolin was being transported on a conveyor belt. This did not solve the dust problem. Thus, prior attempts to utilize added moisture to aid in the bulk handling characteristics of kaolin products left much to be desired.

The present invention is an offspring of an initial concept for reducing drying costs in a kaolin plant. It was calculated that by spray drying only a portion of the kaolin pigment and kneading the spray dried material with a spray applied fluidized filter cake which had not been dried, a useful agglomerated kaolin product suitable for export bulk transport could be prepared at a reduced drying cost. It was postulated that, as a side benefit, dusting might be reduced. This concept was expanded to encompass other materials and mixtures of materials and led to the unexpected discovery that products of the invention do indeed exhibit reduced dusting and unexpectedly have outstanding wetting out properties and desirable high angles of repose. Other advantages, including the ability to produce unique composite pigments, evolved.

SUMMARY OF THE INVENTION

We have discovered a remarkably simple, inexpensive technique for providing dustless moist bulk shipments of powdered hydrophilic (water wettable) pigments such as, for example, hydrous kaolin, calcined kaolin pigments or mixtures thereof.

In accordance with this invention, a dry hydrophilic pigment is mixed with water or an aqueous slurry of pigment, optionally in the presence of a pigment dispersant, and the mixture is mechanically worked by kneading. Water addition is controlled to produce densified dough-like agglomerates having an average size greater than 325 mesh (US sieve). The agglomerates are sufficiently coherent, moist and dust free to be shipped in bulk without previous drying and/or compaction. By kneading, as opposed to high shear mixing, the agglomerates are not so severely compacted that they cannot be eventually slurried in water to form useable water slurries. By controlled addition of water, production of a batter during the kneading step is avoided. The moist, dough-like agglomerates produced in practice of the invention are shipped in that form.

In one preferred embodiment, water is added to dry pigment in the form of an aqueous slurry of pigment, preferably a concentrated dispersed aqueous slurry of a component of the pigment to be present in the dough-like agglomerates. The pigment in the slurry can be the same as or different from the dry pigment with which it is mixed by kneading. In preferred embodiments, the agglomerates are composed of a material selected from the group consisting of hydrous kaolin, calcined kaolin and mixtures thereof. In one especially preferred embodiment, the agglomerates are composed of a mixture of calcined kaolin and hydrous kaolin, the calcined kaolin being the major clay component. These composite agglomerates are obtained by kneading calcined kaolin in dry form with an aqueous slurry of hydrous kaolin, preferably a high solids dispersed aqueous slurry of hydrous kaolin, the amount of water added being controlled by appropriate selection of the proportion of aqueous slurry relative to dry kaolin.

Products of the invention have the advantage of being essentially dust free, i.e., minus 325 mesh (US screen) is less than 2% by weight, preferably less than 1% by weight, and, most preferably less than 0.5% by weight. Unexpectedly the products wet out in water dramatically faster than prior art products of similar moisture content (e.g., pressure filtered clays). Products of the invention do not require the high energy dispersion required to break up the extruded "noodles" of the prior art. Bulk densities are higher than those of the clay component(s) and, thus, lower volumes of product are available for shipment.

The equipment requires a low capital expense, and processing costs are low because energy intensive mixing equipment is not (and should not) be used. Post drying is eliminated.

In the case of embodiments of invention in which water is added to dry pigment in the form of a concentrated fluid aqueous slurry of one of the pigment components, the process has the additional advantage of providing a means for significantly reducing drying and storage costs. Thus, only a portion of the pigment that is shipped has been dried. Other features and advantages will be apparent from the description which follows.

THE FIGURE

The accompanying figure is a graphical representation of the moisture in an agglomerated products of the invention composed of mixtures of calcined kaolin clay and hydrous clay and prepared by adding a high solids (nominally 55% by weight) slurry of hydrous kaolin to dry calcined kaolin followed by kneading. This figure demonstrates that by selecting a desired moisture level, e.g. 20%, a suitable level of slurry of hydrous kaolin, (i.e., 30% in this case) is selected.

DETAILS OF PREFERRED EMBODIMENTS

Formation of agglomerates is accomplished with batch or continuous mixers of the type referred to as kneaders. These mixers impart a low energy input to the charge by the action of multiple plow blades. An example is the single rotor mixer supplied by Littleford Brothers, Ohio. This mixer is also equipped with small chopper blades which should not be in operation if they cause break-up of the agglomerates formed by the plows while kneading the powder/liquid charge. The action on the powder/liquid should be limited to kneading. Energy input is very low, e.g., 5 hp. hr./ton or less. Kneading time is in the range of 2 to 10 minutes, typically 5 minutes. Excessive shear during kneading or use of excessive liquid can convert the dough to a batter which would not be a suitable form for bulk shipment.

The quantity of water used in the agglomeration process will vary with the nature of the pigment, especially the absorptivity of the pigment, and is always so limited that a dough rather than a batter is provided. The dough-like agglomerates are similar in texture and appearance to the dough produced when making pie crust.

To minimize dusting and maximize bulk density, it is desirable to formulate dough-like agglomerates at high moisture while restricting moisture to an amount less than that which will form a batter. A significant advantage of providing agglomerates composed of mixtures of calcined kaolin and hydrous kaolin is that means are provided to achieve a high level of moisture (high bulk density or lower volume) without batter formation. Reference is made to the accompanying figure.

The amount of water present in the agglomerates is preferably the minimum amount required to produce dense dustless agglomerates. Water is also minimized to prevent "sweating" of the agglomerates in shipping containers and/or to prevent lumping of agglomerates which may make it difficult or impossible to unload the agglomerates from shipping containers. Water content is generally in the range of 1 to 25% by weight of the agglomerates, usually in the range of about 3 to 20%, most preferably 5 to 10%.

Generally, pigments useful in practice of this invention have ultimate average particle sizes (size of pigments in dispersed state as determined by SEDIGRAPH® 5000 particle size analyzer) in the range of about ¼ to 20 microns, e.s.d., most frequently 0.3 to 5 microns. The dry pigment may be in the form of a dry powder or pulverulent spray dried microspheres which are typically 40-150 (most usually 40-80) micron average particle size.

Pigments used in practice of the invention (or at least a significant portion of the pigments) are hydrophilic and may or may not be capable of sorbing water. Examples of pigments include inorganic materials such as clays, especially kaolins (hydrous and calcined), natural and synthetic alkaline earth carbonates such as calcite and precipitated calcium carbonate, mica, wollastonite, silica, alumina hydrate, and naturally occurring and synthetic zeolites such as ultramarine and chabazite. Mixtures of two or more of the aforementioned are within the scope of the invention. Mixtures include mixtures of different types of hydrous kaolins, e.g., a blend of delaminated kaolin and #0 grade coating clay. Especially preferred are mixtures of calcined and hydrous kaolins. Minor amounts of hydrophobic pigments such as talc or carbon black can be included in mixtures. While products of the invention contain pigment particles and water as essential ingredients, they may also contain conventional additives. Examples are biocides, thickeners such as CMC, as well as conventional dispersants. However, products of the invention do not contain nonfugitive binders such as waxes and polymeric glues.

Commercially available sources of calcined kaolin pigments useful in practice of this invention include those supplied by Engelhard Corporation under the registered trademarks ANSILEX, ANSILEX 93 and SPECTRAFIL. Generally, these are fine particle size (e.g., average size of 0.6 micron, e.s.d.), low abrasion products prepared by selectively mining kaolin crudes, wet processing the hydrous kaolin, followed by drying, pulverization, calcination and repulverization. See, for example, U.S. Pat. No. 3,586,523 (supra). Calcined kaolins are a pigment of choice when high opacification is a requirement.

One preferred type of hydrous kaolin pigment is delaminated kaolin. Examples are products supplied by Engelhard Corporation under the registered trademarks NUCLAY and NUSHEEN. Nonlimiting examples of nondelaminated kaolin products are those supplied by Engelhard Corporation under the trademarks ULTRAWHITE 90, LUSTRA, HT AND KWW.

As mentioned, presently preferred products of the invention are composed of a mixture of calcined and hydrous kaolin. Proportions (weight basis) of calcined kaolin:hydrous kaolin are in the range of 99:1 to 60:40, preferably 95:5 to 75:25 and, most preferably 90:10 to 80:20. Such agglomerates may be blended back with additional hydrous kaolin by the user. Generally, the maximum amount of calcined kaolin that can be formed into dustless agglomerates is used. This will vary with the hydrous kaolin, the amount of water present, the particular agglomerating procedure used and the requirements for agglomerate size and uniformity, as well as the presence of other conventional kaolin additives. When the proportion of calcined kaolin is too great, the agglomerates may not have the desired high bulk density. On the other hand, when excessive amounts of hydrous kaolin are present, and introduced as slurry, the agglomerates may form a batter.

When producing dough-like agglomerates composed at least in part of hydrous kaolin, all of the water added may be introduced in a slurry of hydrous kaolin. This will reduce drying costs. To curtail the amount of water, it is convenient to employ a high solids dispersed fluid slurry of hydrous kaolin, e.g., a slurry containing at least 50%, preferably at least 60% and, most preferably about 70% solids. The maximum will vary with the nature of the hydrous kaolin. Obviously, control of water level dictates the quantity of hydrous kaolin that is incorporated with the calcined kaolin. Use of a fluid slurry of pigment provides a system amenable to addition by spraying. The presence of a dispersant in the slurry permits the formulation of fluid kaolin slurries containing higher levels of kaolin than would be possible if -dispersant were not present and may enhance wettability. Nonlimiting examples of conventional dispersants are alkali-metal silicates, salts of condensed phosphates, low molecular weight acrylate salts and mixtures thereof. Dispersants are used in conventional quantities. Difficulty may be experienced in spray drying slurries of calcined kaolin and drying costs are not reduced. Thus, when producing dough-like agglomerates composed solely of calcined powder, it is recommended that water, rather than pigment slurry, be added to dry calcined kaolin before or during kneading.

Coarse kaolin fillers such as PMC kaolin used in an illustrative example are normally available in predispersed spray dried form. Dispersant in the case of PMC is a blend of sodium polyacrylate and soda ash or another appropriate alkali. The quantity added on a dry weight basis per ton of kaolin should approach 7 pounds with a range of 5-9 pounds per ton. Delaminated kaolins and coating kaolins are available in spray dried products dispersed with similar chemicals used in similar quantities. Calcined kaolins such as ANSILEX or ANSILEX 93 pigment have no dispersant added when in the dry form. Calcined kaolins may be kneaded with or without dispersant added to the water when used in practice of this invention. In an illustrative example, sodium polyacrylate dispersant was added.

A slurry of hydrous kaolin or water can be sprayed or added in increments to a bed of dry pulverized or spray dried hydrous kaolin, calcined kaolin or mixtures thereof followed by kneading or the dry pigment(s) can be kneaded while the slurry or water is added. Small batch scale mixing can be carried out using a Littleford mixer without using chopper blades, as shown in accompanying illustrative examples. However, it is contemplated that in some instances the production of large quantities of agglomerates may require the use of chopper blades in addition to plow blades in order to avoid the formation of agglomerates that are so large that they cannot be conveniently unloaded and eventually be made down into slurry form.

As mentioned, it is within the scope of the invention to employ a hydrous kaolin that is not delaminated and to use the delaminated kaolin alone or mixed with delaminated kaolin. At least a part of the hydrous kaolin is preferably introduced into the agglomerating equipment as a high solids slurry in order to minimize drying costs in the kaolin plant.

There are four conventional modes of shipping bulk material from the manufacturing site to the port. These include bulk rail hoppers, bulk truck pneumatic trailers, hatch top boxcars, and sea bulk containers. Regardless of the mode of transportation, the material is unloaded using an appropriate mechanical device. At this point, the product is generally conveyed to a silo or hopper as an intermediate point of storage. Direct loading from that point to ships typically takes place; however, with sea bulk containers transportation within that container is also possible. Unloading of the ship is generally done in a reverse fashion for transportation o the final end use point.

In a typical process utilized by a paper mill or other end use application, product unloaded from ships is conveyed to a warehouse or storage area and stored in segregated piles. A loading device which could include conventional conveyors or even front end loaders could be used to transport material to appropriate storage bins or silos. At that point in the process makedown is generally completed in a batch fashion where water is added to a mixing tank and dry clay is conveyed for dispersion. The suitable use of chemicals and dispersants to meet the individual demands of the customer varies. Reslurried product is then typically screened to remove any foreign matter or contamination that results from the transportation process. The solids of the slurries vary depending on the final application. Examples would include nominally 30% solids for filling applications and up to as high as 74% solids utilized for some merchant grade paper coating applications.

The following examples are given for illustrative purposes. In these examples, the term "Pumbles" refers to agglomerates of the invention in which the sole pigment is a hydrous kaolin. "Copumbles" refers to agglomerates which are a mixture of calcined and hydrous kaolin. "Ansipumble" refers to agglomerates in which the sole pigment is calcined kaolin.

Particulars of the pilot plant Littleford Mixer used in some illustrative examples are as follows:
Model #FM-130-D
Plow Motor 15 HP
Motor/Frictional losses (empty) 8 amps (approx. 10 HP)
Motor Load—50 lb Copumble batch, also 8 amps
Total Volume—5 cubic foot equal to 34 gallons
Normal Working Volume=60%=3 cubic foot=21 gallons
Range of Working Volume=30-70% or 1.5-3.5 cubic foot=10-24 gal.

The Littleford Mixer was operated without cutter blades which would have broken down agglomerates formed by kneading.

The following test procedures were employed.

ANGLE OF REPOSE

The equipment used to measure angle of repose consists of a clear Plexiglass sheet bolted to a support board with a funnel attached to the top of the Plexiglass sheet. The funnel opening is large enough to let the largest particles through. To run the test, the sample is poured through the funnel and then, without shaking or vibrating the equipment, the angle of repose is measured with a protractor from the board up to the angle of the clay. In other words, a 35 degree angle of repose is 35 degrees from the horizontal.

BULK DENSITY

One hundred (100) grams of sample are poured into a glass graduated cylinder and the cylinder is observed from the markings on the side and this is recorded. Bulk density is 100 grams divided by the milliliters in the cylinder. The results of the analysis are then converted from gm/cc to #/ft$^3$.

TAMPED BULK DENSITY

The tamped bulk density test uses Stampfvolumeter, model STAV2003, to tamp a sample. 75 grams of sample is weighed and then the level in the cylinder is read after the device is tamped 1500 times.

SCREEN SIZE

A Rotap vibrating dry screen tester with US standard screens was employed using 20 mesh, 40 mesh, 100 mesh, and 325 mesh screens. Results from the test are reflected as plus (or what is retained on those individual screens). In general, 100 total grams of feed were used for the analysis. Products of the invention should be less than 2% by weight −325 mesh, preferably less than 1% −325 mesh and, most preferably, less than 0.5% by weight −325 mesh. The term "substantially dust free" refers to agglomerates meeting this criterion.

WETTABILITY

The method used evaluates the wettability and sparging performance of pigments including calcined kaolins and is carried out at 30% solids.

TEST PROCEDURE

1. Weigh 100.0 grams of deionized water into a 600 ml glass beaker. (14.7 cm height × 7.2 cm inside diameter)
2. Weight out 11.1 gm., 6.5 gm., 7.4 gm., 8.3 gm., 4.6 gm., and 5.0 gm. samples of pigment and store them in separate plastic cups. When these samples are added incrementally to the 100.0 g water they will produce slurry solids of 10%, 15%, 20%, 25%, 27.5% and 30%, respectively.
3. Place the beaker on the magnetic stirring plate and adjust the RPM dial of the stirrer to achieve moderate agitation. (40% Powerstat setting)
4. Add the 11.1 gm. pigment sample to the beaker and start stopwatch.
5. Observe the pigment/water slurry as the pigment wets out. Stop the stopwatch when there is no pigment remaining on the surface of the slurry. Record the elapsed time in seconds. Do not reset stopwatch.
6. Repeat steps 4 and 5 for each of the remaining pigment samples previously measured out into the plastic cups. Always stop stopwatch after the pigment is completely wetted out and record the total elapsed time on the stopwatch.

EXAMPLE 1

Hydrous Pumbles

Hydrous Pumbles were produced utilizing a predispersed spray dried filler clay (PMC) nominally having a particle distribution of 55–65% by weight minus 2 micron. To the spray dried product, filtered filler clay (produced as an intermediate in the manufacture of PMC) at nominally 55–60% solids was introduced to the dried filler clay in the Littleford plow blade mixer in two additions. Three minutes of mixing time was provided between each addition, producing a batch size of nominally 3 cubic feet. The chopper blades were not used. The final Pumbles product had approximately the same bulk density as the spray dried product, 14.5 pounds per cubic feet vs. 15.5. However, the angle of repose improved from 30 degrees, left and right, to 35 degrees, left and right.

The wettability of the hydrous Pumbles filler product was compared to a typical European lump filler clay (SPC and Filler C) in Example 4.

EXAMPLE 2

Copumbles

Dry ANSILEX 93 calcined kaolin was introduced into the Littleford mixer operated without chopper blades. An aqueous slurry of NUCLAY delaminated hydrous kaolin filtered product at nominally 55–60% solids was added to the kneader as described in Example 1. The average bulk density of ANSILEX 93 pigment is 12.1 pounds per cubic foot. Two batches, varying in proportion of calcined to hydrous kaolin and level of water addition, were prepared.

One batch of dough-like agglomerates was produced at 18.9% moisture (which equates to approximately a 70% ANSILEX 93/30% NUCLAY blend). The as is bulk density was 14.7 pounds per cubic foot and the angle of repose was 39 degrees, left and right. The tamped bulk density of this Copumbles sample was 23.7 pounds per cubic foot. The screen size in US standard mesh was 50.3% +20, 38.4% +40, 10.8% +100, 0.5% +325, 0% −325.

A second batch of Copumbles was produced at a higher moisture level in a similar fashion. The following physical properties were measured. At 29.1% moisture for approximately 50% ANSILEX calcined kaolin 50% NUCLAY hydrous kaolin, the as is bulk density was 52.3 pounds per cubic foot; the repose angle was 39 degrees right, 35 degrees left. Tamped bulk density was 60.1 pounds power cubic foot. Screen size was 68.6% +20, 18.5% +40, 11.4% +100 and 1.5% +325, 0% −325.

EXAMPLE 3

ANSIPUMBLES

Dry ANSILEX 93 pigment was used to produce Ansipumbles by adding water to dry ANSILEX 93 pigment in a Littleford mixer. Dough-like agglomerates at two moisture levels were produced. Both samples had the equivalent of $\frac{1}{4}$ pound as is C211 (sodium polyacrylate dispersant) added per equivalent ton of dry clay to the water used to form the product. The first sample produced in the Littleford mixer at 10% total moisture had an as is bulk density of nominally 11.7 pounds per cubic foot and a tamped bulked density of 15.6 pounds per cubic foot. The angle of repose was left 40, right 40 degrees. The screen size of this Ansipumble product was 44.6% +20, 39.4% +40, 15.8% +100, 0.2% +325 and 0% −325. The second sample made in a similar manner contained 20% moisture. As is bulk density was 13.5 pounds per cubic foot. Tamped bulk density was 17 pounds per cubic foot. Screen size was 51.2% +20, 35.6% +40, 13% +100, 0.2% +325 and 0% −325.

As a point of comparison, a random sample of ANSILEX 93 pigment was tested without the formation of a dough-like agglomerate. Dry ANSILEX pigment typically cannot be dry screened for a US standard typical screen test because the material bridges so severely. The as is bulk density of the random sample was 10.5 pounds per cubic foot; tamped bulk density was 17 pounds per cubic foot; repose angle was 39 degrees left and right.

EXAMPLE 4

Wettability tests were carried out with products of the invention (Examples 1 and 3) and commercial bulk kaolin filler products of lower moisture content. Results are summarized below.

| Moisture Wt % of Clay | | 18.1% | 14.4% | 3.5% | 9.5% |
|---|---|---|---|---|---|
| | | | WETTABILITY RESULTS | | |
| SAMPLE WT. | % SOLIDS | EXAMPLE 2 COPUMBLES | EXAMPLE 1 PUMBLES | SPS | FILLER C |
| 11.1 gm. | 10 | 1.0 sec. | 1.2 sec. | 1.7 sec. | 1.5 sec. |
| 6.4 gm. | 15 | 2.4 sec. | 2.4 sec. | 2.7 sec. | 3.2 sec. |
| 7.4 gm. | 20 | 4.4 sec. | 3.8 sec. | 5.0 sec. | 5.3 sec. |
| 8.3 gm. | 25 | 6.7 sec. | 4.9 sec. | lumped | lumped |
| 4.6 gm. | 27.5 | 8.9 sec. | 7.0 sec. | — | — |
| 5.0 gm. | 30 | 11.3 sec.* | 7.8 sec.* | — | — |

*Total Wettability Time

The wettability data provided clearly indicates the advantage in the end use application of the products of the invention. Competitive products shipped in a lump form were limited to 20% solids slurry. At solids in excess of 20%, the competitive materials simply would not wet out, implying a significant limitation for their end use application other than certain filling applications.

EXAMPLE 5

This example illustrates practice of the invention to produce two different Pumbles products, both composed of a coating fraction (89% finer than 2 microns) of gray kaolin using spray dried hydrous kaolin and the dispersed slurry filter product (slurry) of the same particle size distribution obtained in the manufacture of the spray dried gray kaolin. The Littleford mixer and procedures describe in Example 1 were employed. Proportions of spray dried kaolin and slurry were varied to produce a fine product and a coarse product. Properties of the spray dried feed kaolin were:
As is bulk density: 43.7 lbs/cu ft
Tamped bulk density: 53.9 lbs/cu ft
Avg bulk density: 48.8 lbs/cu ft
Angle of repose: 30 left/30 right A relatively fine Pumbles product was produced using 100 pounds of spray dried clay and 3.88 gallons of 47.7% solids clay slurry (21.77 lbs. clay dry basis). The total blend contained 121.77 lbs. of clay and 23.9 lbs. of water. The Littleford mixer pulled 8 amps. Mixing time was 5 minutes.
Properties of the fine Pumbles product were:
As is bulk density: 56.5 lbs/cu ft
Tamped bulk density: 67.9 lbs/cu ft
Avg. Bulk density: 62.2 lbs/cu ft
Angle of repose: 45 left/45 right
Product moisture: 15.5%
The screen size in US standard mesh was 39.6 grams +20 mesh, 5.9 grams +40 mesh, 15.7 grams +100 mesh, 38.0 grams +325 mesh and 0.8 grams −325 mesh.

EXAMPLE 6

This example demonstrates the flexibility of the process of the invention in achieving custom blending for specific customer requirements.

A relatively coarse Pumbles product was prepared using the same spray dried feed kaolin clay of Example 5 (89% by weight finer than 2 microns). Coarser kaolin (65% by weight finer than 2 microns) was used in the slurry. One hundred (100) pounds of dry kaolin and 3.0 gallons of 54.3% slurry (20.37 lbs. clay, dry basis) were used. Properties of the relatively coarse agglomerate product were:
As is bulk density: 52.0 lbs/cu ft
Tamped bulk density: 63.2 lbs/cu ft
Avg. Bulk density: 57.6 lbs/cu ft
Angle of repose: 40 left/40 right
Product moisture: 14.8%
The screen size in US standard mesh was 26.8 grams +20 mesh, 9.5 grams +40 mesh, 19.7 grams +100 mesh, 42.8 grams +325 mesh and 1.2 grams −325 mesh.

EXAMPLE 7

In this example, a plant scale kneader mixer equipped with paddle blades was used to prepare Pumbles products composed of delaminated kaolin clay as the sole pigment.

The mixer had a dual shaft containing 102 paddles per shaft, paddle spacing 3 inches apart, paddle pitch 4.7 degrees. Dimensions of the equipment were: total length 29 feet, total width 4 feet, 8¾ inches, working depth 2 feet 11 inches. Motor Specifications 75 HP 1775 RPMs, shaft RPM to paddles=27 Planetary gear ratio 54.42; maximum capacity 30 tons per hour. The equipment drew about amps when empty and about 40 amps when ⅔ full, indicating a fractional horsepower per ton work input.

The materials used were spray dried NUCLAY delaminated kaolin (3% moisture) and a 57% solids slurry of dispersed filter cake used in the manufacture of NUCLAY kaolin. The dry throughput was at 10 to 11 tons per hour as limited by the drier capacity with direct feed to the mixer. (Feed from a silo rather than direct has produced acceptable product at rates in excess of 30 tons per hour). The slurry addition was 3.5 to 3.7 gallons per minute. Product moisture was 8 to 9%.
Properties of the spray dried feed were:
As is bulk density: 45.5 lbs/cu ft
Tamped bulk density: 54.6 lbs/cu ft
Avg bulk density: 50.1 lbs/cu ft
Angle of repose: 35 left/35 right
Product moisture: 3%
Properties of the agglomerated product were:
As is bulk density: 51.5 lbs/cu ft
Tamped bulk density: 61.6 lbs/cu ft
Avg. Bulk density: 56.6 lbs/cu ft
Angle of repose: 37 left/37 right
The screen size in US standard mesh was 22.6 grams +20 mesh, 0.7 grams +40 mesh, 46.5 grams +100 mesh, 30.0 grams +325 mesh and 0.2 grams −325 mesh.

EXAMPLE 8

The following data show how kneading a 70% solids of hydrous kaolin with spray dried hydrous kaolin immediately prior to loading (without evaporative losses) increases drying and loading capacity:

| Component | Tons (Dry) | % Water |
|---|---|---|
| Case I | | |
| Spray dried | 86 | 1% |
| Slurry | 14 | 30% |
| Dough-like agglomerates | 100 | 5% |
| Case II | | |
| Spray dried | 69 | 1% |
| Slurry | 31 | 30% |
| Dough-like agglomerates | 100 | 10% |

These data show that blending 70% solids slurry and spray dried product to 5% moisture increases capacity of a spray drier installation shipping a conventional 1–3% moisture product by 16%; blending to 10% moisture increasing capacity by 45%. Using a 60% solids slurry, rather than a 70% solids slurry, would generate ⅔ of the capacity increase.

We claim:
1. Kneaded dough-like agglomerates comprising at least one powdered hydrophilic pigment, said agglomerates containing from 1 to 30% by weight of water, having an average size in excess of 325 mesh (U.S. Standard) and being substantially free from dust, said agglomerates being sufficiently compact to resist break- down to dust during shipment but being capable of being dispersed in water when agitated therein using conventional pigment makedown equipment.

2. The agglomerates of claim 1 wherein said hydrophilic pigment comprises hydrous kaolin clay, calcined kaolin clay or a mixture thereof.

3. The agglomerates of claim 2 wherein said pigment consists of hydrous kaolin clay.

4. The agglomerates of claim 2 wherein said pigment consists of calcined kaolin clay.

5. The agglomerates of claim 2 wherein said pigment consists essentially of a mixture of hydrous kaolin clay and calcined kaolin clay in a weight ratio of particles of calcined kaolin to particles of hydrous kaolin is in the range of 99:1 to 60:40.

6. The agglomerates of claim 5 wherein said hydrous kaolin is delaminated.

7. The agglomerates of claim 5 wherein the weight ratio of particles of calcined kaolin to particles of hydrous kaolin is in the range of 95:5 to 75:25.

8. The agglomerates of claim 6 wherein the weight ratio of particles of calcined kaolin to particles of hydrous kaolin is in the range of 90:10 to 80:20.

9. A method for producing a pigment composition adapted for bulk shipment and subsequent unloading in a mechanical conveyor and makedown in water which comprises kneading a major weight of particles of dry pigment with water or an aqueous slurry of pigment particles using an energy input not to exceed 5 hp. hr./ton, using only sufficient water to bind the mixture of particles into coherent dustless agglomerates.

10. The method of claim 9 wherein a pigment dispersant is present.

11. The method of claim 9 wherein said dry pigment comprises hydrous kaolin.

12. The method of claim 9 wherein said dry pigment comprises calcined kaolin.

13. A method for producing a clay composition adapted for bulk shipment and subsequent unloading in a mechanical conveyor and makedown in water which comprises kneading a major weight of particles of dry calcined kaolin pigment with an aqueous slurry of particles of hydrous kaolin pigment by spray application of said aqueous slurry using only sufficient water to bind the mixture of particles into coherent agglomerates and an energy input not to exceed 5 hp. hr./ton.

14. The method of claim 13 wherein a conventional clay dispersant is present in said aqueous slurry.

15. The method of claim 13 wherein said hydrous kaolin is a delaminated grade.

16. The method of claim 15 wherein the weight ratio of particles of calcined kaolin to particles of hydrous kaolin is in the range of 99:1 to 60:40.

17. The method of claim 15 wherein the weight ratio of particles of calcined kaolin to particles of hydrous kaolin is in the range of 95:5 to 75:25.

18. The method of claim 15 wherein the weight ratio of particles of calcined kaolin to particles of hydrous kaolin is in the range of 90:10 to 80:20.

19. The method of claim 15 wherein said agglomerates contain from 5 to 30% by weight of water.

20. The method of claim 15 wherein said agglomerates have an average size in the range of 40 to 80 mesh.

21. The method of claim 15 wherein said agglomerates contain less than 2% by weight of particles finer than 325 mesh.

* * * * *